(12) United States Patent
Haas Rugel et al.

(10) Patent No.: US 11,404,216 B2
(45) Date of Patent: Aug. 2, 2022

(54) ELECTRODE COOLED CAPACITOR ASSEMBLY

(71) Applicant: Bayerische Motoren Werke Aktiengesellschaft, Munich (DE)

(72) Inventors: Erick Maximiliano Haas Rugel, Munich (DE); Roman Hamerski, Unterhaching (DE); Christophe Lafaye, Unterhaching (DE); Christoph Sudan, Eurasburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/216,503

(22) Filed: Dec. 11, 2018

(65) Prior Publication Data
US 2019/0108945 A1 Apr. 11, 2019

Related U.S. Application Data

(63) Continuation of application No. PCT/EP2017/069012, filed on Jul. 27, 2017.

(30) Foreign Application Priority Data

Aug. 29, 2016 (DE) .................. 10 2016 216 237.3

(51) Int. Cl.
*H01G 4/38* (2006.01)
*H01G 2/04* (2006.01)
(Continued)

(52) U.S. Cl.
CPC ................. *H01G 4/38* (2013.01); *H01G 2/04* (2013.01); *H01G 2/08* (2013.01); *H01G 4/18* (2013.01); *H01G 4/224* (2013.01); *Y02T 10/70* (2013.01)

(58) Field of Classification Search
CPC .. H01G 4/38; H01G 2/04; H01G 2/08; H01G 4/18; H01G 4/224; H01G 4/258;
(Continued)

(56) References Cited

U.S. PATENT DOCUMENTS 10,128,045 B2 11/2018 Sasaki
2008/0117602 A1 5/2008 Korich et al.
(Continued)

FOREIGN PATENT DOCUMENTS

CN 203434633 U 2/2014
CN 103635981 A 3/2014
(Continued)

OTHER PUBLICATIONS

Chinese-language Office Action issued in counterpart Chinese Application No. 201780036396.7 dated Dec. 26, 2019 with English translation (18 pages).
(Continued)

*Primary Examiner* — Michael P McFadden
(74) *Attorney, Agent, or Firm* — Crowell & Moring LLP

(57) ABSTRACT

A capacitor assembly has a capacitor, a first terminal, a cooling device and a housing which contains the capacitor. The first terminal has a first heat absorbing part and a first heat dissipating part. The first terminal dissipates heat from a first side of the capacitor to the cooling device via the first heat absorbing part and the first heat dissipating part. The first side of the capacitor faces away from the cooling device.

14 Claims, 2 Drawing Sheets

(51) Int. Cl.
*H01G 2/08* (2006.01)
*H01G 4/18* (2006.01)
*H01G 4/224* (2006.01)

(58) Field of Classification Search
CPC .. Y02T 10/7022; B60L 3/0061; B60L 15/007; H02M 1/143
See application file for complete search history.

(56) References Cited

U.S. PATENT DOCUMENTS

| | | | |
|---|---|---|---|
| 2009/0059467 A1 | 3/2009 | Grimm et al. | |
| 2009/0229849 A1* | 9/2009 | Yang | H02G 5/005 174/68.2 |
| 2010/0053842 A1* | 3/2010 | Devoe | H01G 4/232 361/306.3 |
| 2010/0259898 A1* | 10/2010 | Kimura | H05K 7/209 361/704 |
| 2013/0033913 A1 | 2/2013 | Sparka | |
| 2014/0126107 A1* | 5/2014 | Yoda | H01G 4/248 361/303 |
| 2014/0313806 A1* | 10/2014 | Shinohara | H01L 23/473 363/141 |
| 2016/0157381 A1 | 6/2016 | Takeuchi et al. | |
| 2017/0316878 A1 | 11/2017 | Peuser | |
| 2018/0342350 A1* | 11/2018 | Koyama | H01G 2/04 |

FOREIGN PATENT DOCUMENTS

| | | |
|---|---|---|
| DE | 10 2007 054 618 A1 | 6/2008 |
| DE | 10 2009 055 376 A1 | 6/2011 |
| DE | 10 2011 007 307 A1 | 10/2012 |
| DE | 10 2014 221 006 A1 | 4/2016 |
| EP | 2 367 277 A2 | 9/2011 |
| EP | 2 511 922 A1 | 10/2012 |
| EP | 2 717 461 A1 | 4/2014 |
| EP | 2 728 595 A1 | 5/2014 |
| EP | 1 878 031 B1 | 6/2014 |
| JP | 2008-148530 A | 6/2008 |
| JP | 2009-177872 A | 8/2009 |
| JP | 2010-34433 A | 2/2010 |
| JP | 2011-233795 A | 11/2011 |
| JP | 2012-124319 A | 6/2012 |
| JP | 2012-199350 A | 10/2012 |
| JP | 2013-115279 A | 6/2013 |
| JP | 2014-143227 A | 8/2014 |
| JP | 2015-10377 A | 6/2015 |
| JP | 2015-109748 A | 6/2015 |
| WO | WO 2016/002177 A1 | 1/2016 |

OTHER PUBLICATIONS

International Search Report (PCT/ISA/210) issued in PCT Application No. PCT/EP2017/069012 dated Nov. 7, 2017 with English translation (nine (9) pages).
German-language Written Opinion (PCT/ISA/237) issued in PCT Application No. PCT/EP2017/069012 dated Mar. 8, 2018 (seven (7) pages).
German-language Search Report issued in counterpart German Application No. 10 2016 216 237.3 dated Jun. 13, 2017 with English translation (14 pages).
Chinese-language Office Action issued in Chinese Application No. 201780036396.7 dated Jun. 2, 2021 with English translation (17 pages).

* cited by examiner

ELECTRODE COOLED CAPACITOR ASSEMBLY

CROSS REFERENCE TO RELATED APPLICATIONS

This application is a continuation of PCT International Application No. PCT/EP2017/069012, filed Jul. 27, 2017, which claims priority under 35 U.S.C. § 119 from German Patent Application No. 10 2016 216 237.3, filed Aug. 29, 2016, the entire disclosures of which are herein expressly incorporated by reference.

BACKGROUND AND SUMMARY OF THE INVENTION

The present invention relates to a capacitor assembly having a capacitor, a first terminal, a cooling device, and a housing which contains the capacitor, as well as to a system and to a vehicle having the capacitor assembly.

Electric capacitors in which the capacitor coils are wound onto a metallized plastic film must have insulating properties. The electrical insulation, or the plastic film, respectively, has the disadvantage that the heat that is created in the capacitor is difficult to discharge, in particular when the capacitor has a housing that is an impediment to the discharge of heat. Because of the latter, the temperature in the interior of the capacitor can become very high, for example 100° C. or more, when the capacitor is in operation. However, a specific temperature must not be exceeded because the capacitor would otherwise be damaged.

In order for a positive discharge of the heat that is created in the capacitor to be achieved, it is known in the prior art for the capacitor coil to be brought into physical contact with means of a cooling device that conduct heat in a positive manner, and for a heat-conducting connection to be established between an end of the capacitor coil and the cooling device.

A plurality of capacitor coils are usually disposed in one container. The upper side of the container is opened such that a cooling device can be disposed on the upper side of the capacitor. The heat on the upper side of the capacitor, or on the side that faces the cooling installation, respectively, can be discharged by contacting a cooling installation that is disposed on the upper side of the container. However, the heat that is created on the lower side of the capacitor, or on the side that faces away from the cooling installation, respectively, is discharged to the outside only in a deficient manner. According to results of experiments, the lower side of the capacitor can reach a high internal temperature which is approx. 15° C. higher than the temperature of the upper side of the capacitor. Should the lower side not be cooled and the temperature on the lower side of the capacitor exceed a specific limit temperature, the capacitor can be damaged because of a high temperature on the lower side of the capacitor. Therefore, both the upper side as well as the lower side of the capacitor have to be cooled in a uniform manner.

EP 1 878 031 B1 furthermore discloses a capacitor which is disposed in a housing. A cooling plate is fitted to the upper side of the capacitor, or of the housing, respectively. A cooling face for cooling the capacitor is provided on the upper side of the capacitor. The cooling face is formed by a terminal of the capacitor. The current is directed to the capacitor by way of the terminal. The electrically conducting metal sheets of the two terminals mutually overlap on the upper side of the capacitor. The upper one of two metal sheets is used as the cooling element. The upper metal sheet is in thermal contact with the cooling plate that is fitted to the upper side of the capacitor. Heat can thus be discharged from the upper side and from two sides of the capacitor by way of the terminals to the cooling plate.

Proceeding therefrom, it is the object of the present invention to achieve a capacitor assembly having an improved heat dissipation function. Moreover, the costs and the installation space of the capacitor assembly are not to be significantly increased.

The capacitor assembly according to the invention comprises a capacitor, a first terminal, a cooling device, and a housing which contains the capacitor. The first terminal has a first heat-absorbing part and a first heat-dissipating part. The first terminal dissipates heat output from a first side of the capacitor to the cooling device by way of the first heat-absorbing part and the first heat-dissipating part. The first side of the capacitor is a side that faces away from the cooling device.

The first terminal thus serves not only as an electric conductor, or an electric terminal, respectively, of the capacitor assembly according to the invention, but also for forming a "heat bridge" between the side of the capacitor that faces away from the cooling device and the cooling device. The heat that is created on the side of the capacitor that faces away from the cooling device can be discharged to the outside, or to the cooling device, respectively, by way of the heat bridge. The capacitor can therefore be efficiently cooled such that any damage to the capacitor by virtue of a high temperature on the side of the capacitor that faces away from the cooling device can be avoided.

The first heat-absorbing part is preferably in thermal contact with the first side of the capacitor, and the first heat-dissipating part is preferably in thermal contact with the cooling device. The contact faces of the heat-dissipating parts can thermally contact the cooling device, for example by way of an electrically insulating heat-conducting pad, or by way of another electrically insulating element that however conducts heat in a positive manner, so as to transmit the conduction of heat to the cooling device. It is advantageous for this electrically insulating element that however conducts heat in a positive manner to have a certain elasticity since, on account thereof, production tolerances can be compensated and a durable positive transmission of heat can be ensured.

According to one refinement of the invention, the first heat-absorbing part is electrically connected to the capacitor, wherein the first heat-dissipating part has a first cooling lug.

According to one further refinement of the invention, the capacitor assembly comprises a second terminal which has a second heat-absorbing part and a second heat-dissipating part, wherein the second terminal enables a conduction of heat from a second side of the capacitor to the cooling device by way of the second heat-absorbing part and the first heat-dissipating part. The capacitor can be efficiently cooled on account thereof. Any damage to the capacitor by virtue of a high temperature can therefore be avoided.

The second terminal advantageously serves for forming a "heat bridge" between the second side of the capacitor and the cooling device. The heat that is created on the second side of the capacitor can be discharged to the outside, or to the cooling device, respectively, by way of the heat bridge.

The second side of the capacitor is preferably a side that faces the cooling device.

The side that faces away from the cooling device and the side of the capacitor that faces the cooling device can be cooled in a uniform manner on account of the first and the second terminal.

The second heat-absorbing part is preferably in thermal contact with the second side of the capacitor, wherein the second heat-dissipating part is in thermal contact with the cooling device.

The second heat-absorbing part is preferably electrically connected to the capacitor, and the second heat-dissipating part preferably has a second cooling lug.

The first terminal is preferably in thermal contact with the cooling device.

The heat output can advantageously also be dissipated to the cooling device by way of the first terminal.

The cooling device is preferably disposed on the housing of the capacitor.

The first heat-absorbing part preferably has a U-shaped portion which comprises two legs and a web that is provided between the two legs. The U-shaped heat-absorbing part encloses the capacitor from three sides, or from the side that faces away from the cooling device and from two other sides of the capacitor, respectively, wherein the web of the U-shaped heat-absorbing part is electrically connected to an electrode of the capacitor on the side of the capacitor that faces away from the cooling device.

The first heat-absorbing part is preferably connected to the first heat-dissipating part.

The first terminal is preferably disposed on a first periphery of the housing, wherein the first heat-dissipating part is disposed on a second periphery of the housing.

A substantial advantage of the invention is to be seen in that almost no additional installation space is required for the design embodiment according to the invention. Therefore, the housing of the capacitor, if at all, requires only an insignificant modification in order for the capacitor assembly according to the invention to be implemented.

The first heat-dissipating part and the second heat-dissipating part are preferably disposed in a common plane and are mutually electrically insulated.

The capacitor is preferably cast into the housing by way of a casting compound. On account thereof, the capacitor can both be fastened as well as electrically insulated in relation to the outside by way of the casting.

The present invention furthermore proposes a system. The system comprises an IGBT module and the above-mentioned capacitor assembly, wherein the cooling device serves for cooling both the capacitor assembly as well as the IGBT module. The IGBT module is provided for converting a DC voltage that is provided from a high-voltage battery of an electric vehicle or hybrid vehicle, for example, to a multi-phase AC voltage, or vice versa.

The present invention furthermore proposes an electric vehicle or hybrid vehicle having the above-mentioned system.

During normal operation of the capacitor, the temperature is the highest on the side of the capacitor that faces away from the cooling device. Using the arrangement according to the invention, the heat that is created in the capacitor, in particular the heat on the side of the capacitor that faces away from the cooling device, can be very readily directed, for example by way of metal strips, to the outside, or to the cooling device, respectively. According to the invention, the first electric terminal of the capacitor can form a heat bridge, specifically by way of the heat-absorbing part and the heat-dissipating part, or the first cooling lug, respectively. Since the first heat-absorbing part is in thermal contact with the side of the capacitor that faces away from the cooling device, on the one hand, and the first cooling lug is in thermal contact with the cooling device, on the other hand, the heat output that is created on the side of the capacitor that faces away from the cooling device can be efficiently discharged to the outside, or to the cooling device, respectively. Any damage to the capacitor by virtue of a high internal temperature can be avoided on account thereof.

The terminal, the first heat-absorbing part, and the cooling lug can advantageously be formed in an integral manner. The first heat-absorbing part and the first cooling lug, conjointly with the first terminal and the heat-absorbing part, can be formed by a metal sheet which can be, for example, a punched metal sheet. Since the first heat-absorbing part and the first cooling lug can be integrally formed by a metal sheet, the implementation of the cooling lug according to the present invention is relatively cost-effective.

Moreover, the capacitor assembly according to the invention does not require any further installation space in order for the heat-absorbing part and the cooling lug to be disposed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
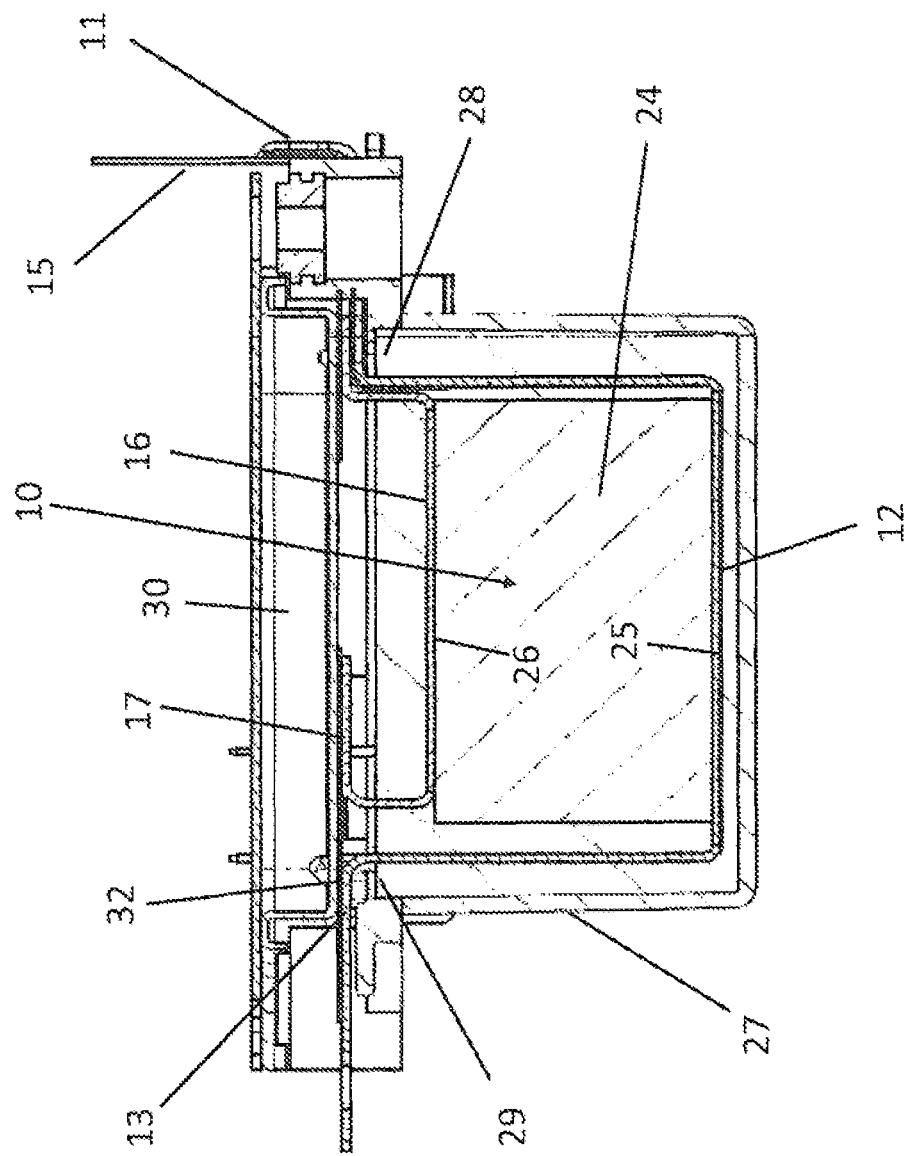
FIG. 1 is a cross section view of an exemplary embodiment of a capacitor assembly.

FIG. 1 shows a capacitor assembly 10 having a capacitor 24, a first terminal 11, a second terminal 15, a cooling device 30, and a housing 27. The first terminal 11 and the second terminal 15 are in each case connected to an electrode of the capacitor. The first terminal 11 and the second terminal 15 are disposed so as to run on top of one another on a portion 14, wherein an insulation is also provided between the two terminals 11 and 15. The insulation is optionally embodied in multiple tiers. The first terminal 11 and the second terminal 15 are in each case routed out of the housing 27 in a first periphery 28 of the housing 27. The cooling device 30, for example a liquid cooler, is provided above the opening of the housing 27.

The first terminal 11 has a first heat-absorbing part 12. The first heat-absorbing part 12 is formed by a U-shaped metal sheet. The U-shaped first heat-absorbing part 12 is electrically connected to the lower side 25 of the capacitor 24, that is to say to the side that faces away from the cooling device 30. The first heat-absorbing part 12 extends from the first periphery 28 of the housing 27 to a lower side 25 of the capacitor 24, and from the lower side 25 of the capacitor 24 to a second periphery 29 of the housing 27. A soldering region for soldering thereto a contact face of the lower side 25 of the capacitor 24 is located on the lower contact face of the first heat-absorbing part 12, so that the first heat-absorbing part 12 can be fastened to the lower side 25 of the capacitor 24.

The first heat-absorbing part 12 is connected to a cooling lug 13 outside the housing 27. The cooling lug 13 is disposed above the housing 27 and is in thermal contact with the cooling device 30 which is fitted above the capacitor 24. The first heat-absorbing part 12 and the cooling lug 13 form a heat bridge between the lower side 25 of the capacitor 24 and the upper side of the housing 27, or of the cooling device 30, respectively. Since the cooling lug 13 is in thermal contact with the cooling device 30, the heat that is created on the lower side of the capacitor can be discharged in a positive manner to the cooling lug 13 on the upper side of the housing 27 and by way of the thermal contact between the cooling lug 13 and the cooling device 30 can be directed further to the cooling device 30.

The cooling lug 13 can be disposed such that the contact face thereof is thermally connected to the cooling device 30 by way of an electrically insulating heat-conducting material 32, for example a heat-conducting pad, so as to transmit heat to the cooling device 30. The temperature of the lower side 25 of the capacitor 24 is lowered on account thereof. Any damage to the capacitor by virtue of the high heat output that is created on the lower side of the capacitor can therefore be avoided.

The insulating layers of the heat-conducting material 32 are indeed illustrated so as to be single-tiered, but said insulating layers can particularly preferably be embodied so as to be double-tiered or even multi-tiered. The insulation can in particular be performed by use of multi-tiered insulating films.

The first terminal 11 comprises the first heat-absorbing part 12 and the cooling lug 13, such that the heat output can be directed from the lower side of the capacitor, which is provided on the base of the housing 27, by way of the first terminal 11, the first heat-absorbing part 12, and the cooling lug 13 to the outside. The first terminal 11, the heat-absorbing part 12, and the cooling lug 13 can be produced by bending a metal sheet. The heat-absorbing part 12 can also be fastened as a separate part to the first terminal 11. The cooling lug 13 can also be connected as a separate part to the heat-absorbing part 12.

The portion 14 is disposed on the first periphery 28 of the housing 27 and is in thermal contact with the cooling device 30 such that the two terminals 11 and 15 can dissipate the heat to the cooling device 30 by way of the portion 14.

In an entirely analogous manner, the second terminal 15 has a second heat-absorbing part 16. The second heat-absorbing part 16 is formed by a metal sheet which is in thermal contact with the upper side 26, that is to say with the side of the capacitor 24 that faces the cooling device 30. The heat-absorbing part 16 extends from the first periphery 28 of the housing 27 onto the upper side 26 of the capacitor 24 and along the latter to the second periphery 29 of the housing 27. A soldering region for soldering thereto a contact face of the upper side 26 of the capacitor 24 is located on the lower contact face of the heat-absorbing part 16, so that the heat-absorbing part 16 can be fastened to the upper side 26 of the capacitor 24.

The heat-absorbing part 16 is connected to a cooling lug 17 above the housing 27. The cooling lug 17 is in thermal contact with the cooling device 30 which is disposed above the capacitor 24. The cooling lug 17 and the heat-absorbing part 16 in the lateral view shown in FIG. 1 are bent in a U-shaped manner. The heat-absorbing part 16 and the cooling lug 17 form a heat bridge between the upper side 26 of the capacitor 24 and the cooling device 30. Since the cooling lug 17 is in thermal contact with the cooling device 30, the heat that is created on the upper side of the capacitor can be readily directed to the outside to the cooling lug 17, and by way of the thermal contact between the cooling lug 17 and the cooling device 30 be directed to the cooling device 30.

The cooling lug 17 can be disposed such that the contact face thereof by way of the electrically insulating heat-conducting material 32 is thermally connected to the cooling device 30 in order for heat to be transmitted to the cooling device 30. The temperature of the upper side 26 of the capacitor 24 can be lowered on account thereof.

The second terminal 15 comprises the heat-absorbing part 16 and the cooling lug 17 such that the quantity of heat can be directed from the upper side 26 of the capacitor 24 by way of the second terminal 15, the heat-absorbing part 16, and the cooling lug 17, to the outside. The second terminal 15, the heat-absorbing part 16, and the cooling lug 17 can be produced by bending a metal sheet. The heat-absorbing part 16 can also be fastened as a separate part to the second terminal 15. The cooling lug 17 can also be connected as a separate part to the heat-absorbing part 16.

In order for the capacitor 24 and the contact faces thereof, or the heat-absorbing parts 12 and 16, respectively, to be protected, it is expedient for a casting compound, for example a synthetic resin, to be cast into the housing 27. The capacitor 24 can thus be cast into the housing 27. The upper edge of the casting compound is located between the upper side 26 of the capacitor 24 and the upper edge of the housing 27. A hermetic encapsulation of the capacitor 24 as well as of the heat-absorbing parts 12 and 16 is therefore implemented by way of the casting. Moreover, a short thermal path from the contact faces of the capacitor 24 to the cooling lugs 13 and 17 is implemented in the case of the exemplary embodiment shown.

The cooling device 30 can be disposed on an IGBT module (IGBT referring to an insulated-gate bipolar transistor). For example, the cooling device 30 is provided between the capacitor assembly 10 and the IGBT module (not shown), wherein the cooling device also serves for cooling the IGBT module. The capacitor assembly 10 and the IGBT module can advantageously dissipate the heat output to a common cooling device.

Figure 2B:
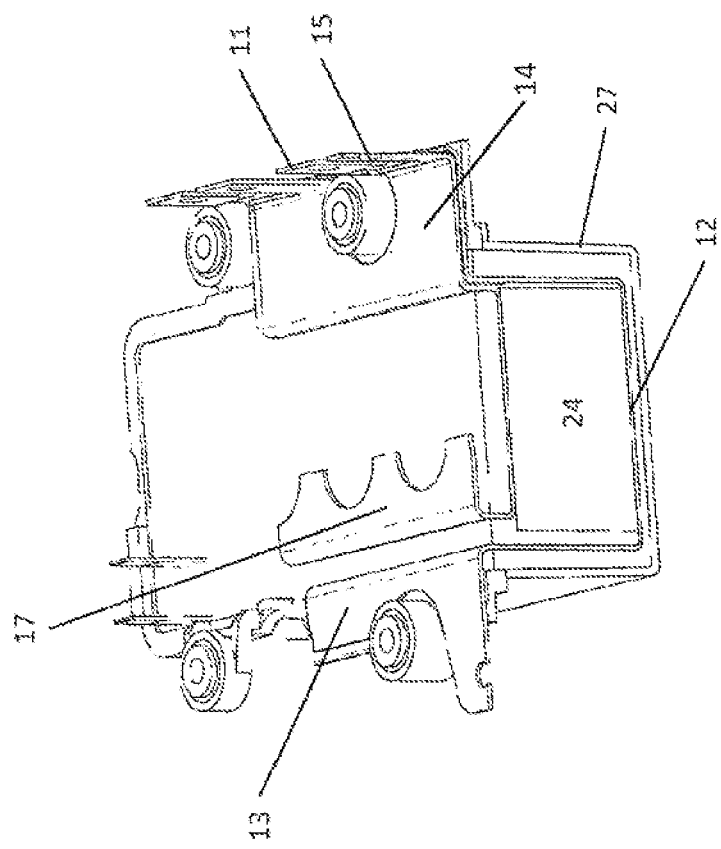
FIG. 2B is a further perspective sectional illustration of the capacitor assembly of FIG. 1 or FIG. 2A, respectively.
Figure 2A:
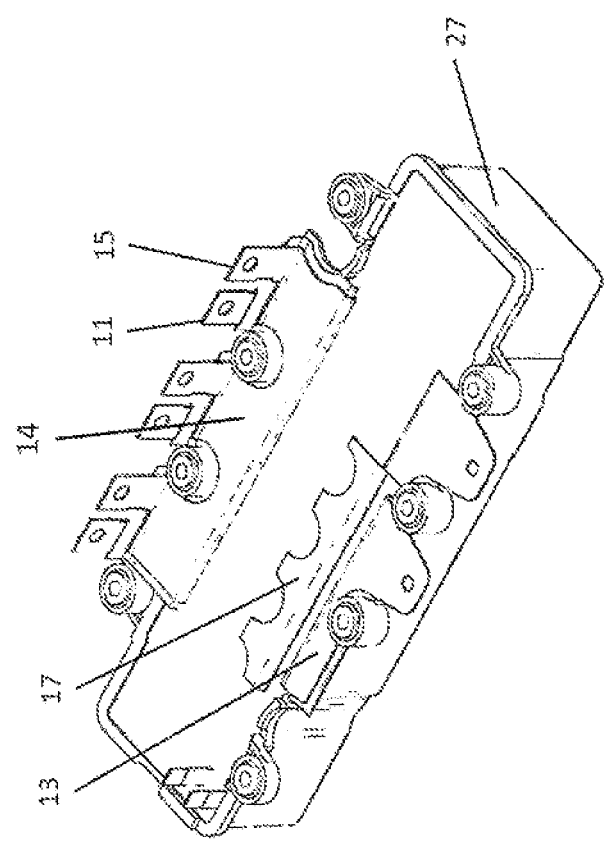
FIG. 2A is a perspective illustration of the capacitor assembly according to FIG. 2.

FIG. 2A and FIG. 2B show the capacitor assembly according to the invention without the cooling device 30 in a perspective illustration. The cooling lugs 13 and 17 are disposed on the same plane and bent in two opposite directions so as to be mutually insulated. The cooling lugs 13 and 17 are designed such that the contact face of the cooling lugs 13 and 17 is sufficiently large for transmitting the quantity of heat by way of the heat-conducting material 32 to the cooling device 30. The better the heat conductivity of the heat-conducting material 32, the smaller the cooling lugs 13 and 17 can be configured. The cooling lugs 13 and 17 can be formed by a sheet-metal, for example from copper or aluminum. The cooling lugs 13 and 17 can be rectangular. A plurality of slots can also be provided in the cooling lugs 13 and 17 in order for the discharge of heat to be improved.

It can be seen in the upper region of the capacitor assembly in FIG. 2A that three upwardly projecting contact plates are provided for each terminal in order for the inductance of the capacitor to be minimized, such that a low-inductance distribution of the current across a large area of a terminal results. The number of the contact plates can however also be increased or reduced, depending on the application of the capacitor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A capacitor assembly, comprising:
a capacitor;

a first terminal;
a cooling device; and
a housing which contains the capacitor, wherein
the first terminal has a first heat-absorbing part and a first heat-dissipating part,
the first terminal is configured to dissipate heat from a first side of the capacitor to the cooling device by way of the first heat-absorbing part and the first heat-dissipating part,
the first side of the capacitor is a side that faces away from the cooling device,
the first heat-absorbing part defines a first cooling lug above the housing,
the first cooling lug being in thermal contact with the cooling device which is disposed above the capacitor, and
the first cooling lug and the first heat-absorbing part, in a lateral view, being bent in a U-shaped manner.

2. The capacitor assembly as claimed in claim 1, wherein the first heat-absorbing part is electrically connected to the capacitor.

3. The capacitor assembly as claimed in claim 1, further comprising:
a second terminal which has a second heat-absorbing part and a second heat-dissipating part, wherein
the second terminal dissipates heat from a second side of the capacitor to the cooling device by way of the second heat-absorbing part and the second heat-dissipating part.

4. The capacitor assembly as claimed in claim 3, wherein the second side of the capacitor is a side that faces the cooling device.

5. The capacitor assembly as claimed in claim 4, wherein the second heat-absorbing part is in thermal contact with the second side of the capacitor, and the second heat-dissipating part is in thermal contact with the cooling device.

6. The capacitor assembly as claimed in claim 4, wherein the second heat-absorbing part is electrically connected to the capacitor, and
the second heat-dissipating part has a second cooling lug.

7. The capacitor assembly as claimed in claim 3, wherein the first heat-dissipating part and the second heat-dissipating part are disposed in a common plane and are mutually electrically insulated.

8. The capacitor assembly as claimed in claim 1, wherein the first terminal is in thermal contact with the cooling device.

9. The capacitor assembly as claimed in claim 1, wherein the cooling device is disposed on the housing.

10. The capacitor assembly as claimed in claim 1, wherein the first heat-absorbing part is connected to the first heat-dissipating part.

11. The capacitor assembly as claimed in claim 1, wherein a casting compound is provided, by which the capacitor is cast into the housing.

12. A system, comprising:
an IGBT module; and
a capacitor assembly as claimed in claim 1, wherein the cooling device is further configured to cool the IGBT module.

13. An electric vehicle or a hybrid vehicle, comprising a system as claimed in claim 12.

14. The capacitor assembly as claimed in claim 1, wherein the first terminal is disposed on a first side of the housing, and
the first heat-dissipating part is disposed on a second side of the housing, which is opposite to the first side of the housing.

* * * * *